United States Patent
Hildreth, Jr.

(10) Patent No.: US 6,840,272 B2
(45) Date of Patent: Jan. 11, 2005

(54) FUEL-CONDITIONING DEVICE

(75) Inventor: Edward D. Hildreth, Jr., Clarksville, TN (US)

(73) Assignee: American Standard International Inc., New York, NY (US)

( * ) Notice: Subject to any disclaimer, the term of this patent is extended or adjusted under 35 U.S.C. 154(b) by 163 days.

(21) Appl. No.: 10/283,410

(22) Filed: Oct. 28, 2002

(65) Prior Publication Data

US 2004/0079421 A1 Apr. 29, 2004

(51) Int. Cl.⁷ .................. F16K 11/044; B01D 35/30
(52) U.S. Cl. .................. 137/545; 137/556; 210/341
(58) Field of Search ............... 137/545, 599.13, 137/599.14, 599.11, 556; 210/340, 341, 424

(56) References Cited

U.S. PATENT DOCUMENTS

| 1,253,344 | A | * | 1/1918 | Braun | 137/599.14 |
| 1,531,609 | A | * | 3/1925 | Groves | 210/341 |
| 2,921,687 | A | * | 1/1960 | Jenkins | 210/341 |
| 4,432,385 | A | * | 2/1984 | Legris | 137/599.16 |

* cited by examiner

*Primary Examiner*—Stephen M. Hepperle
(74) *Attorney, Agent, or Firm*—William J. Beres; William O'Driscoll

(57) ABSTRACT

A fuel-conditioning device for removing moisture from fuel includes two replaceable fuel-conditioning cartridges. The cartridges are alternately put in use by selectively positioning a valve actuator. A marking system for the fuel-conditioning cartridges and the valve actuator identifies which cartridge is in use and which can be serviced. A cartridge can be replaced while maintaining a continuous flow of fuel.

22 Claims, 4 Drawing Sheets

US 6,840,272 B2

FUEL-CONDITIONING DEVICE

BACKGROUND OF THE INVENTION

1. Field of the Invention

The present invention relates to the conditioning of liquefied petroleum fuels, and more specifically to a fuel-conditioning device for removing moisture, or other contaminants from the fuel.

2. Description of Related Art

Liquid petroleum fuels are often used for appliances such as furnaces, ovens, stoves, water heaters, and direct-fired absorption refrigerant systems. Examples of such manufactured fuels include propane, butane, propylene, butylenes, iso-butane, and various mixtures thereof.

As compared to natural gas, manufactured fuels are often a wet, contaminated fuel, due to the industry's transport, test, and storage methods. Propane, for example, is often transported in bulk rail, truck, and barge containers rather than piped. Water may be introduced into the propane through periodic hydrostatic burst strength testing of the transport/storage containers and/or steam cleaning of the containers following bulk transport of other contaminating materials, such as ammonia.

Since propane is hydroscopic and less dense than water, the water tends to collect at the bottom of the containers at the inlet to the container's off-load standpipe. Consequently, water is often the first material removed when off-loading bulk liquid propane. To minimize this problem, regional and local distributors of propane routinely add methanol to disperse the water more evenly throughout the propane. Unfortunately, the entrained moisture is then forwarded onto the final point of use where the liquid propane vaporizes just prior to combustion. Moisture at this point can contaminate valves, burners and other components associated with the appliance that burns the gas.

Once delivered to its general destination of use, propane is routinely stored outdoors in a pressurized tank above ground. Before the propane is conveyed to the heating appliance, a pressure regulator between the tank and the appliance reduces the propane's pressure to a level appropriate for the appliance. During the winter or when the outdoor temperature is relatively cold, moisture can precipitate at the pressure regulator, due the cold propane becoming even colder as its pressure is reduced. The precipitated moisture can interfere with the function of the pressure regulator and/or interfere with combustion at the appliance.

Various driers can be used to remove the moisture from fuel; however, the driers themselves can eventually become saturated with moisture. So, the driers may require periodic servicing to remove the moisture from the system entirely. Unfortunately, periodic servicing of a drier may require that the gas be temporarily shut off, which may interfere with the operation of the appliance.

SUMMARY OF THE INVENTION

To address the problem of fuel contaminated with water or other contaminants, it is an object of the invention to provide a fuel-conditioning device for removing contaminants without having to interrupt the flow of fuel.

Another object is to provide such a device with a housing having a minimal number of parts to reduce the likelihood of a leak.

Another object is to provide such a device with a pair of fuel-conditioning elements that can be used alternately to allow one to function while the other is being serviced.

Another object is to provide a marking system that clearly identifies which fuel-conditioning element is in use and which can be serviced.

Another object is to provide a marking system adapted to employ a variety of distinguishing properties or characteristics including, but not limited to, color, quantity, shape, and alphanumeric identity.

Yet, another object is to provide a fuel-conditioning device with a valve actuator whose position identifies which fuel-conditioning element is in use and which can be serviced.

A further object is to provide a fuel-conditioning device that removes moisture from propane.

A still further object is to provide a fuel-conditioning device that includes fuel-conditioning elements or cartridges that readily screw into a housing for effective sealing and ease of servicing.

Another object is to provide a fuel-conditioning device that includes a fuel-conditioning element comprising one or more of a variety of moisture-removing structures including, but not limited to a silica gel, molecular sieve, and activated alumina adsorbent.

Another object is to provide a fuel-conditioning device with a valve mechanism that inhibits backflow through the fuel-conditioning device when a fuel-conditioning element is being serviced.

These and other objects of the invention are provided by a fuel-conditioning device that includes two fuel-conditioning elements. The elements are alternately put in use by selectively positioning a valve actuator. A marking system for the fuel-conditioning elements and the valve actuator identify which fuel-conditioning element is in use and which can be serviced.

The present invention provides a fuel-conditioning device for conditioning a fuel. The device comprises a housing defining an inlet, an outlet, a first passageway, and a second passageway, wherein the first passageway and second passageway are downstream of the inlet and upstream of the outlet, relative to the fuel flowing from the inlet to the outlet. The device also comprises a first cartridge removably attached to the housing; a first fuel-conditioning element attached to the first cartridge and disposed in the first passageway; a second cartridge removably attached to the housing; and a second fuel-conditioning element attached to the second cartridge and disposed in the second passageway. The device further comprises a first valve seat interposed between the inlet and the first passageway; a second valve seat interposed between the inlet and the second passageway; and a valve plug disposed in the inlet of the housing and being selectively movable to a first location and a second location, such that in the first location the valve plug disengages the first valve seat to place the inlet in fluid communication with the first fuel-conditioning element in the first passageway, and in the second location the valve plug disengages the second valve seat to place the inlet in fluid communication with the second fuel-conditioning element in the second passageway.

The present invention also provides a fuel-conditioning device for conditioning a fuel. The device comprises a housing defining an inlet, an outlet, a first passageway, and a second passageway, wherein the first passageway and second passageway are downstream of the inlet and upstream of the outlet, relative to the fuel flowing from the inlet to the outlet. The device also comprises a first cartridge removably attached to the housing; a first fuel-conditioning element attached to the first cartridge and disposed in the first passageway; a first marking adjacent the first fuel-conditioning element; a second cartridge removably attached to the housing; a second fuel-conditioning element attached to the second cartridge and disposed in the second passageway; a second marking adjacent the second fuel-conditioning element; a first valve seat interposed between the inlet and the first passageway; a second valve seat interposed between the inlet and the second passageway; and a valve plug disposed in the inlet of the housing and being selectively movable to a first location and a second location. In the first location the valve plug disengages the first valve seat to place the inlet in fluid communication with the first fuel-conditioning element in the first passageway. In the second location the valve plug disengages the second valve seat to place the inlet in fluid communication with the second fuel-conditioning element in the second passageway. The device further comprises a valve operator connected to the housing and the valve plug, wherein the valve operator is movable relative to the housing between a first position and a second position to selective move the valve plug between the first location and the second location, respectively. The device also comprises a first mark disposed on the valve operator and corresponding to the first marking adjacent the first fuel-conditioning element; and a second mark disposed on the valve operator and corresponding to the second marking adjacent the second fuel-conditioning element. The housing covers the second mark when the valve operator is in the first position, thereby indicating the inlet is in fluid communication with the first fuel-conditioning element in the first passageway. The housing uncovers the second mark when the valve operator is in the second position, thereby indicating the inlet is in fluid communication with the second fuel-conditioning element in the second passageway. The device still further comprises a valve mechanism supported by the housing and disposed downstream of the first fuel-conditioning element, downstream of the second fuel-conditioning element, and upstream of the outlet. The valve mechanism is movable to selectively impede backflow of the fuel from the outlet toward the second fuel-conditioning element when the valve plug is in the first location and impede backflow of the fuel from the outlet toward the first fuel-conditioning element when the valve plug is in the second location, thereby facilitating the replacement of the first cartridge when the valve plug is in the first location and facilitating the replacement of the second cartridge when the valve plug is in the second location.

The present invention further provides a fuel-conditioning device for conditioning a fuel. The device comprises a housing defining a first passageway and a second passageway. The housing includes a unitary piece that defines an inlet and an outlet wherein the first passageway and second passageway are downstream of the inlet and upstream of the outlet, relative to the fuel flowing from the inlet to the outlet. The device also comprises a first cartridge screwed into the housing; a first fuel-conditioning element attached to the first cartridge and disposed in the first passageway; a first marking adjacent the first fuel-conditioning element; a second cartridge screwed into the housing; a second fuel-conditioning element attached to the second cartridge and disposed in the second passageway; a second marking adjacent the second fuel-conditioning element; a first valve seat interposed between the inlet and the first passageway; a second valve seat interposed between the inlet and the second passageway; and a valve plug disposed in the inlet of the housing and being selectively movable to a first location and a second location. In the first location the valve plug disengages the first valve seat to place the inlet in fluid communication with the first fuel-conditioning element in the first passageway. In the second location the valve plug disengages the second valve seat to place the inlet in fluid communication with the second fuel-conditioning element in the second passageway. The device additionally comprises a valve operator that includes a valve plug connected to a valve stem. The valve stem is screwed into the housing and is movable relative thereto between a first position and a second position to selective move the valve plug between the first location and the second location, respectively. The device further comprises a first mark disposed on the valve stem and corresponding to the first marking adjacent the first fuel-conditioning element; a second mark disposed on the valve stem and corresponding to the second marking adjacent the second fuel-conditioning element. The housing covers the second mark when the valve operator is in the first position, thereby indicating the inlet is in fluid communication with the first fuel-conditioning element in the first passageway. The housing uncovers the second mark when the valve operator is in the second position, thereby indicating the inlet is in fluid communication with the second fuel-conditioning element in the second passageway. The device still further comprises a valve mechanism supported by the housing and disposed downstream of the first fuel-conditioning element, downstream of the second fuel-conditioning element, and upstream of the outlet. The valve mechanism is movable to selectively impede backflow of the fuel from the outlet toward the second fuel-conditioning element when the valve plug is in the first location and impede backflow of the fuel from the outlet toward the first fuel-conditioning element when the valve plug is in the second location, thereby facilitating the replacement of the first cartridge when the valve plug is in the first location and facilitating the replacement of the second cartridge when the valve plug is in the second location.

The present invention further provides a method of conditioning a fuel using a fuel conditioning device. The method comprises the steps of: defining a housing including an inlet, an outlet, a first passageway and a second passageway wherein the first and second passageways are downstream of the inlet and upstream of the outlet relative to the fuel flowing from the inlet to the outlet; removably attaching a first cartridge to the housing; attaching a first fuel conditioning element to the first cartridge wherein the fuel conditioning element is disposed in the first passageway; removably attaching a second cartridge to the housing; attaching a second fuel conditioning element to the second cartridge and disposing said second fuel conditioning element in the second passageway; interposing a first valve seat between the inlet and the first passageway; interposing a second valve seat between the inlet and the second passageway; and disposing a valve plug in the inlet of the housing wherein the valve plug is selectively movable to a first location where the valve plug disengages the first valve seat to place the inlet in fluid communication with the first fuel conditioning element in the first passageway and to a second location such that the valve plug disengages the second valve seat to place the inlet in fluid communication with the second fuel conditioning element in the second passageway.

The method provides the further steps of providing a first marking adjacent the first fuel conditioning element; providing a second marking adjacent the second fuel conditioning element; and connecting a valve operator to the housing and the valve plug such that the valve operator is moveable relative to the housing between a first position and a second position to selectively move the valve plug between the first location and the second location respectively.

DESCRIPTION OF THE PREFERRED EMBODIMENT

Figure 1:
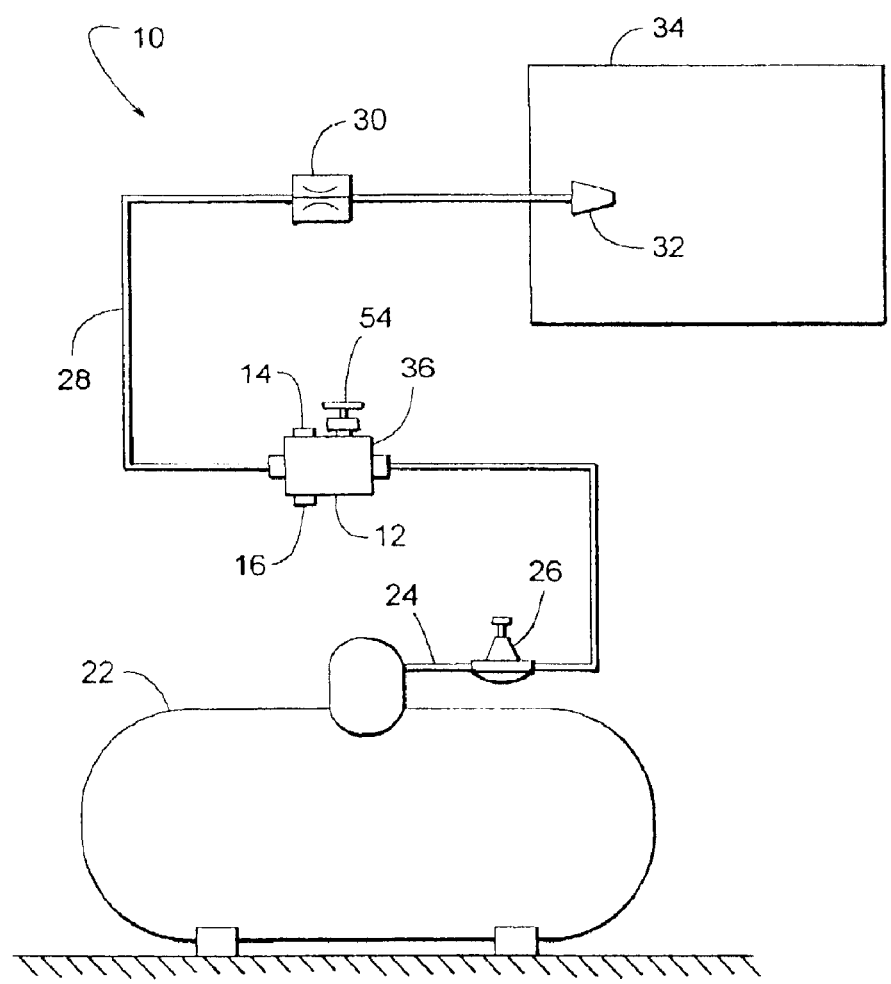
FIG. 1 is a schematic diagram of a fuel system incorporating the subject invention.

FIG. 1 illustrates just one example of a fuel system 10 that includes a fuel-conditioning device 12 for reducing the amount of moisture or other contaminants in the fuel. Although the invention will be described with reference to propane, other fuels are well within the scope of the invention. The term, "propane" generally refers to any hydrocarbon fluid of the methane series $CH_3CH_2CH_3$, usually derived from crude petroleum. Examples of other fuels include, but are not limited to, butane, propylene, butylenes, iso-butane, and various mixtures thereof.

Figure 2:
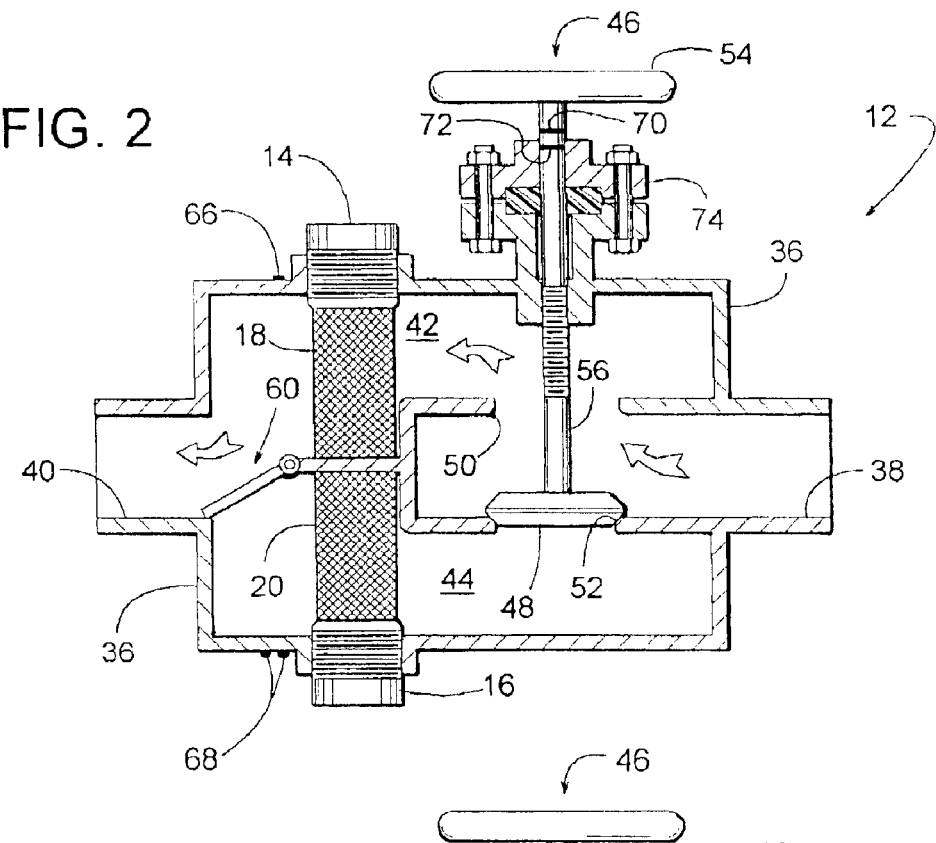
FIG. 2 is a cross-sectional view of a fuel-conditioning device with its valve operator at a first position.

Referring further to FIG. 2, device 12 includes two replaceable cartridges, a first cartridge 14 and a second cartridge 16. Cartridges 14 and 16 respectively hold first and second fuel-conditioning elements 18 and 20 that extract moisture or contaminants from the propane. To provide uninterrupted flow, a valve system of device 12 selectively directs propane to flow through one of the cartridges, so the other can be replaced when necessary.

In the example of FIG. 1, a storage tank 22 holds the propane as a pressurized liquid or gas. A fuel line 24 leading from tank 22 conveys the propane to a conventional pressure regulator 26, which reduces the propane's pressure before another line 28 delivers the propane to a metering valve 30. Metering valve 30 reduces the pressure further to a level appropriate for a burner nozzle 32 of a propane-burning appliance 34. Examples of a propane-burning appliance include, but are not limited to, furnaces, ovens, stoves, water heaters, and direct-fired absorption refrigerant systems.

Fuel-conditioning device 12 is preferably installed in fuel line 28, between pressure regulator 26 and metering valve 30. Alternatively, device 12 could be installed anywhere between tank 22 and nozzle 32.

In FIG. 2, fuel-conditioning device 12 is shown comprising a housing 36 that defines a propane inlet 38, a propane outlet 40, a first passageway 42, and a second passageway 44. The first and second passageways 42 and 44 are situated to convey propane from inlet 38 to outlet 40. The portion of housing 36 that defines inlet 38 and outlet 40 is preferable of a single, unitary piece to minimize the likelihood of a leak.

To remove moisture or other contaminants from the propane, first fuel-conditioning element 18 is disposed in first passageway 42, and second fuel-conditioning element 20 is in second passageway 44. Elements 18 and 20 are schematically illustrated to represent any structure or substance that can help filter, absorb or remove contaminants (especially water) from the propane. Examples of elements 18 and 20 include, but are not limited to, a silica gel having an affinity for water, a molecular sieve whose micro porosity helps separate water molecules from fuel, an activated alumina adsorbent (i.e., any aluminum oxide having an affinity for water).

To facilitate the replacement of fuel-conditioning elements 18 and 20, the elements are each preferably supported by their own cartridge that screws into housing 36. In this case, first cartridge 14 supports element 18, and second cartridge 16 supports element 20.

Figure 3:
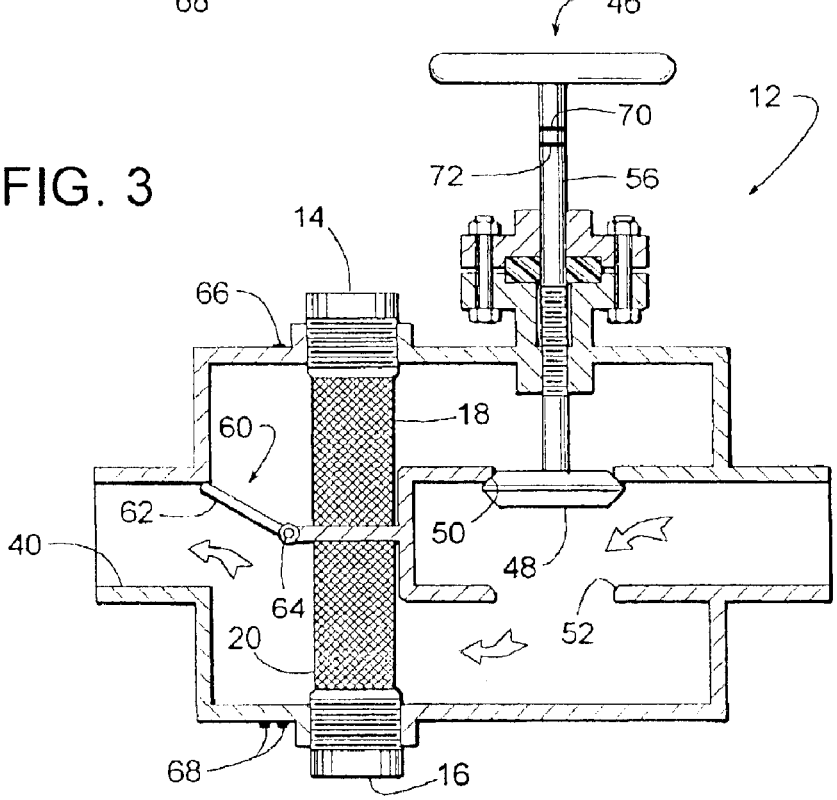
FIG. 3 is similar to FIG. 2, but with the valve operator at a second position.

To enable the replacement of a cartridge and its element without interrupting the flow of propane to burner 32 (FIG. 1), device 12 includes a valve operator 46 connected to move a valve plug 48 between a first location (FIG. 2) and a second location (FIG. 3). In the second location (FIG. 3), valve plug 48 is against a first valve seat 50 to direct propane across second fuel-conditioning element 20. And in the first location (FIG. 2), plug 48 is against a second valve seat 52 to direct propane across first element 18.

Valve operator 46 includes a handle 54 connected to a threaded valve stem 56, which in turn screws into housing 36 and connects to valve plug 48. Turning handle 54 thus moves valve operator 46 between a first position (FIG. 2) and a second position (FIG. 3), which moves plug 48 between valve seats 52 and 50, respectively. When valve plug 48 is halfway between its first and second locations, both valve seats 50 and 52 are at least partially open to ensure flow from inlet 38 to outlet 40. In other words, valve plug 48 operates in a make-before-break manner to avoid interrupting flow upon switching from one cartridge to another.

Figure 4:
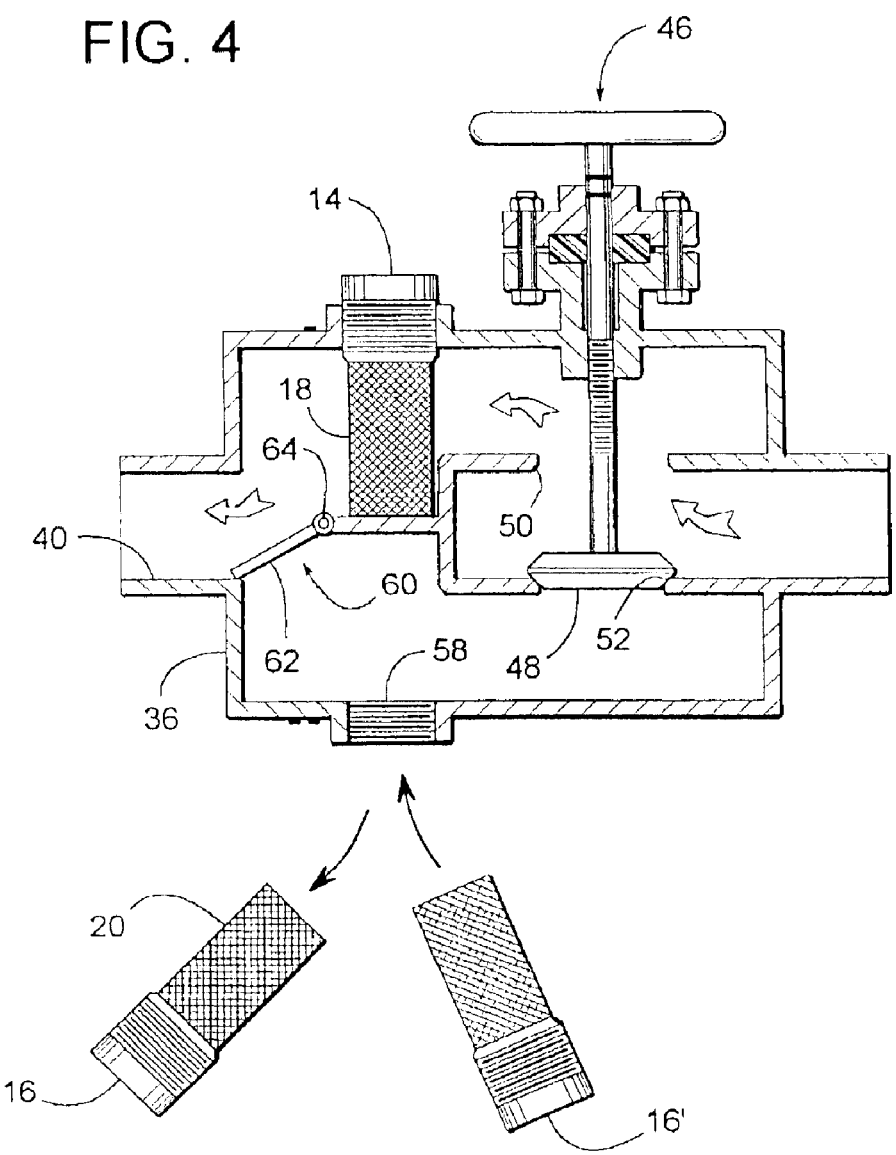
FIG. 4 is a cross-sectional view of the fuel-conditioning device of FIG. 2, but showing a fuel-conditioning cartridge being replaced.

When valve operator 46 is at its first position and valve plug 48 is at its first location against second valve seat 52, second cartridge 16 can be replaced by another second cartridge 16', as shown in FIG. 4. Similarly, when valve operator 46 is at its second position and valve plug 48 is at its second location against first valve seat 50, as shown in FIG. 3, first cartridge 18 can be replaced by another similar second cartridge.

When a cartridge is removed, as shown in FIG. 4, an opening 58 is temporarily left in housing 36. A backflow of propane from outlet 40 through opening 50 can be inhibited by providing housing 36 with a valve mechanism 60. The term, "valve mechanism" refers to any device for selectively obstructing flow. Valve mechanism 60 is schematically illustrated to represent any such valve mechanism. Examples of a valve mechanism include, but are not limited to, a check valve, globe valve, gate valve, ball valve, solenoid valve, spool valve, and various combinations thereof. Valve mechanism 60 is schematically shown as a valve plate 62 that is free to pivot about an axis 64.

In the situation shown in FIG. 4, propane flowing through first cartridge 14 and outlet 40 urges plate 62 to pivot downward to obstruct propane from flowing back from outlet 40 to opening 58. In FIG. 3, propane flowing through second cartridge 16 and outlet 40 urges plate 62 to pivot upward to allow the servicing of first cartridge 14.

To determine which cartridge 14 or 16 may be replaced without interruption of propane flow, fuel-conditioning device 12 is provided with a marking system. In some embodiments, for example, a first marking 66 is placed adjacent first fuel-conditioning element 18, a second marking 68 is placed adjacent second fuel-conditioning element 20, and a first mark 70 and a second mark 72 are placed on valve operator 46. First and second markings 66 and 68 can be distinguished from each other by various characteristics. Examples of such characteristics include, but are not limited to, quantity, color, shape, alphanumeric identity, etc. Also, the first marking adjacent the first fuel-conditioning element preferably corresponds to the first mark on the valve operator. And the second marking adjacent the second fuel-conditioning element preferably corresponds to the second mark on the valve operator.

The marks on the valve operator are positioned such that the position of the valve operator relative to the valve housing determines the extent to which the marks are displayed, or uncovered. With device 12 in the configuration shown in FIG. 2, for example, second mark 72 is hidden underneath housing 36 (i.e., covered by a gland plate 74 of housing 36), while first mark 70 is visible. A single mark 70 being visible corresponds in quantity to first marking 66 adjacent first fuel-conditioning element 18, which indicates first cartridge 14 can be serviced. When device 12 is as shown in FIG. 3, two marks 70 and 72 are visible, which corresponds in quantity to second marking 68 adjacent second fuel-conditioning element 20, thereby indicating second cartridge 16 can be serviced. In some embodiments, first marking 66 and first mark 70 are both red, so they correspond to each other. Meanwhile, second mark 72 is green, while second marking 68 includes a red mark and a green mark to correspond to both red and green marks 70 and 72 being visible when valve operator 46 is in the position of FIG. 3.

Figure 5:
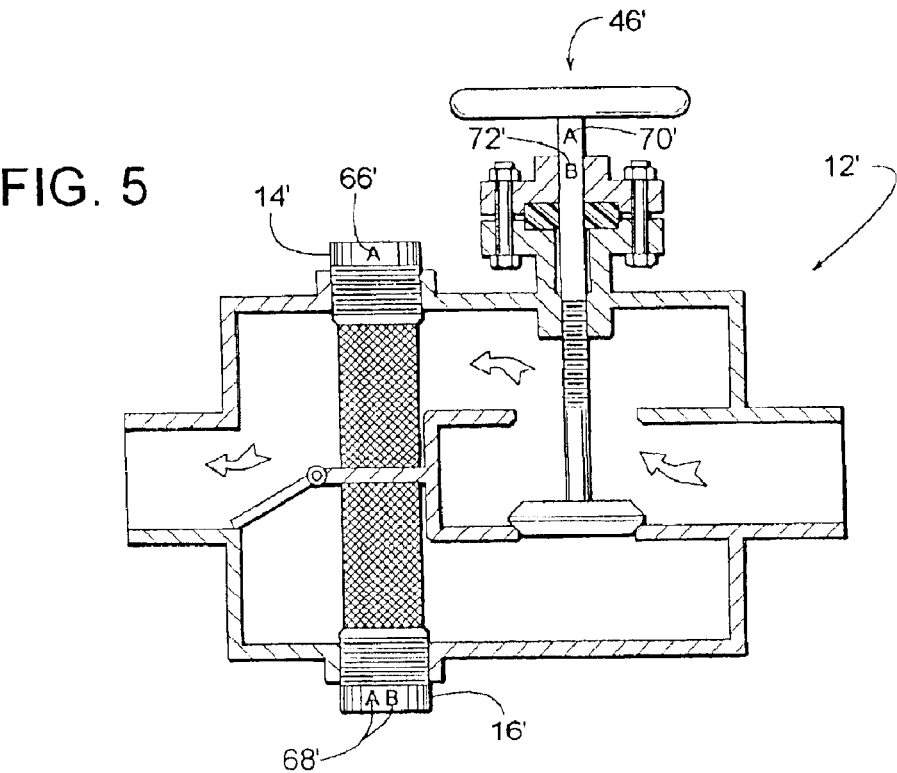
FIG. 5 is similar to FIG. 2, but of another embodiment.
Figure 6:
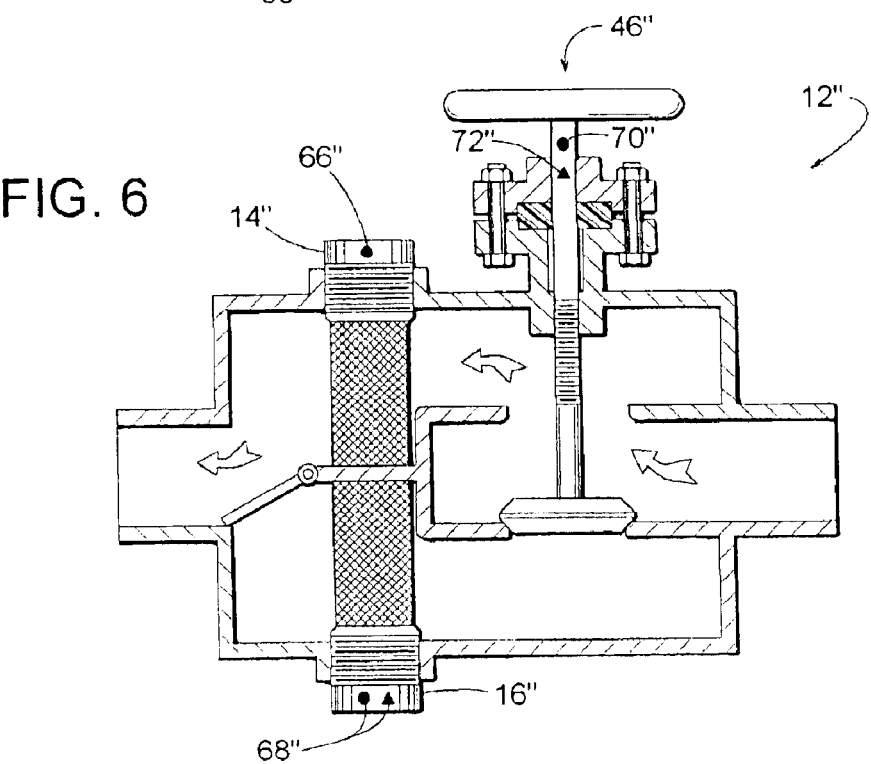
FIG. 6 is similar to FIG. 2, but of yet another embodiment.

In a similar embodiment, shown in FIG. 5, a fuel-conditioning device 12' includes a first marking 66' disposed on a first cartridge 14' and a second marking 68' on a second cartridge 16'. Markings 66' and 68' correspond to a first mark 70' and a second mark 72' on a valve operator 46'. Markings 66' and 68' are distinguishable from each other by their unique alphanumeric identities. The same is true for marks 70' and 72'.

In another similar embodiment, a fuel-conditioning device 12" includes a first marking 66" disposed on a first cartridge 14" and a second marking 68" on a second cartridge 16". Markings 66" and 68" correspond in shape to a first mark 70" and a second mark 72" on valve operator 46". Markings 66" and 68" are distinguishable from each other by their unique shape. Likewise, the same is true for marks 70" and 72".

Although the invention is described with reference to a preferred embodiment, it should be appreciated by those skilled in the art that other variations are well within the scope of the invention. Therefore, the scope of the invention is to be determined by reference to the claims, which follow.

I claim:

1. A fuel-conditioning device for conditioning a fuel, comprising:
    a housing defining an inlet, an outlet, a first passageway, and a second passageway, wherein the first passageway and second passageway are downstream of the inlet and upstream of the outlet, relative to the fuel flowing from the inlet to the outlet;
    a first cartridge removably attached to the housing;
    a first fuel-conditioning element attached to the first cartridge and disposed in the first passageway;
    a second cartridge removably attached to the housing;
    a second fuel-conditioning element attached to the second cartridge and disposed in the second passageway;
    a first valve seat interposed between the inlet and the first passageway;
    a second valve seat interposed between the inlet and the second passageway;
    a valve plug disposed in the inlet of the housing and being selectively movable to a first location and a second location, such that in the first location the valve plug disengages the first valve seat to place the inlet in fluid communication with the first fuel-conditioning element in the first passageway, and in the second location the valve plug disengages the second valve seat to place the inlet in fluid communication with the second fuel-conditioning element in the second passageway;
    a first marking adjacent the first fuel-conditioning element;
    a second marking adjacent the second fuel-conditioning element;
    a valve operator connected to the housing and the valve plug, wherein the valve operator is movable relative to the housing between a first position and a second position to selective move the valve plug between the first location and the second location, respectively;
    a first mark disposed on the valve operator and corresponding to the first marking adjacent the first fuel-conditioning element; and
    a second mark disposed on the valve operator and corresponding to the second marking adjacent the second fuel-conditioning element, wherein the housing covers the second mark when the valve operator is in the first position, thereby indicating the inlet is in fluid communication with the first fuel-conditioning element in the first passageway, and wherein the housing uncovers the second mark when the valve operator is in the second position, thereby indicating the inlet is in fluid communication with the second fuel-conditioning element in the second passageway.

2. The fuel-conditioning device of claim 1, wherein the first marking and the second marking are on the first cartridge and the second cartridge respectively.

3. The fuel-conditioning device of claim 1, wherein the first marking and the second marking are on the housing.

4. The fuel-conditioning device of claim 1, wherein the first marking and the second marking are alphanumeric.

5. The fuel-conditioning device of claim 1, wherein the first marking and the second marking are distinguishable by color.

6. The fuel-conditioning device of claim 1, wherein the first marking and the second marking are distinguishable by shape.

7. The fuel-conditioning device of claim 1, wherein the first marking and the second marking are distinguishable by quantity.

8. The fuel-conditioning device of claim 1, wherein the fuel is propane.

9. The fuel-conditioning device of claim 1, wherein the first cartridge and the second cartridge screw into the housing.

10. The fuel-conditioning device of claim 1, wherein the first fuel-conditioning element and the second fuel-conditioning element comprise a silica gel.

11. The fuel-conditioning device of claim 1, wherein the first fuel-conditioning element and the second fuel-conditioning element comprise a molecular sieve.

12. The fuel-conditioning device of claim 1, wherein the first fuel-conditioning element and the second fuel-conditioning element comprise an activated alumina adsorbent.

13. The fuel-conditioning device of claim 1, wherein the valve operator includes a threaded valve stem that screws into the housing, and wherein the first mark and the second mark are disposed on the valve stem.

14. The fuel-conditioning device of claim 1, further comprising a valve mechanism supported by the housing and disposed downstream of the first fuel-conditioning element, downstream of the second fuel-conditioning element, and upstream of the outlet, wherein the valve mechanism is movable to selectively impede backflow of the fuel from the outlet toward the second fuel-conditioning element when the valve plug is in the first location and impede backflow of the fuel from the outlet toward the first fuel-conditioning element when the valve plug is in the second location, thereby facilitating the replacement of the first cartridge when the valve plug is in the first location and facilitating the replacement of the second cartridge when the valve plug is in the second location.

15. The fuel-conditioning device of claim 1, wherein the inlet and the outlet are defined by a portion of the housing, wherein the portion is a unitary piece.

16. A fuel-conditioning device for conditioning a fuel, comprising:
   a housing defining an inlet, an outlet, a first passageway, and a second passageway, wherein the first passageway and second passageway are downstream of the inlet and upstream of the outlet, relative to the fuel flowing from the inlet to the outlet;
   a first cartridge removably attached to the housing;
   a first fuel-conditioning element attached to the first cartridge and disposed in the first passageway;
   a first marking adjacent the first fuel-conditioning element;
   a second cartridge removably attached to the housing;
   a second fuel-conditioning element attached to the second cartridge and disposed in the second passageway;
   a second marking adjacent the second fuel-conditioning element;
   a first valve seat interposed between the inlet and the first passageway;
   a second valve seat interposed between the inlet and the second passageway;
   a valve plug disposed in the inlet of the housing and being selectively movable to a first location and a second location, such that in the first location the valve plug disengages the first valve seat to place the inlet in fluid communication with the first fuel-conditioning element in the first passageway, and in the second location the valve plug disengages the second valve seat to place the inlet in fluid communication with the second fuel-conditioning element in the second passageway;
   a valve operator connected to the housing and the valve plug, wherein the valve operator is movable relative to the housing between a first position and a second position to selective move the valve plug between the first location and the second location, respectively;
   a first mark disposed on the valve operator and corresponding to the first marking adjacent the first fuel-conditioning element;
   a second mark disposed on the valve operator and corresponding to the second marking adjacent the second fuel-conditioning element, wherein the housing covers the second mark when the valve operator is in the first position, thereby indicating the inlet is in fluid communication with the first fuel-conditioning element in the first passageway, and wherein the housing uncovers the second mark when the valve operator is in the second position, thereby indicating the inlet is in fluid communication with the second fuel-conditioning element in the second passageway; and
   a valve mechanism supported by the housing and disposed downstream of the first fuel-conditioning element, downstream of the second fuel-conditioning element, and upstream of the outlet, wherein the valve mechanism is movable to selectively impede backflow of the fuel from the outlet toward the second fuel-conditioning element when the valve plug is in the first location and impede backflow of the fuel from the outlet toward the first fuel-conditioning element when the valve plug is in the second location, thereby facilitating the replacement of the first cartridge when the valve plug is in the first location and facilitating the replacement of the second cartridge when the valve plug is in the second location.

17. The fuel-conditioning device of claim 16, wherein the first marking and the second marking are on the housing.

18. The fuel-conditioning device of claim 16, wherein the first cartridge and the second cartridge screw into the housing.

19. The fuel-conditioning device of claim 16, wherein the valve operator includes a threaded valve stem that screws into the housing, and wherein the first mark and the second mark are disposed on the valve stem.

20. The fuel-conditioning device of claim 16, wherein the inlet and the outlet are defined by a portion of the housing, wherein the portion is a unitary piece.

21. A fuel-conditioning device for conditioning a fuel, comprising:
   a housing defining a first passageway and a second passageway, the housing includes a unitary piece that defines an inlet and an outlet wherein the first passageway and second passageway are downstream of the inlet and upstream of the outlet, relative to the fuel flowing from the inlet to the outlet;
   a first cartridge screwed into the housing;
   a first fuel-conditioning element attached to the first cartridge and disposed in the first passageway;
   a first marking adjacent the first fuel-conditioning element;
   a second cartridge screwed into the housing;
   a second fuel-conditioning element attached to the second cartridge and disposed in the second passageway;
   a second marking adjacent the second fuel-conditioning element;
   a first valve seat interposed between the inlet and the first passageway;
   a second valve seat interposed between the inlet and the second passageway;
   a valve plug disposed in the inlet of the housing and being selectively movable to a first location and a second location, such that in the first location the valve plug disengages the first valve seat to place the inlet in fluid communication with the first fuel-conditioning element in the first passageway, and in the second location the valve plug disengages the second valve seat to place the inlet in fluid communication with the second fuel-conditioning element in the second passageway;
   a valve operator that includes a valve plug connected to a valve stem, wherein the valve stem is screwed into the housing and is movable relative thereto between a first position and a second position to selective move the valve plug between the first location and the second location, respectively;
   a first mark disposed on the valve stem and corresponding to the first marking adjacent the first fuel-conditioning element;
   a second mark disposed on the valve stem and corresponding to the second marking adjacent the second fuel-conditioning element, wherein the housing covers the second mark when the valve operator is in the first position, thereby indicating the inlet is in fluid communication with the first fuel-conditioning element in the first passageway, and wherein the housing uncovers the second mark when the valve operator is in the second position, thereby indicating the inlet is in fluid communication with the second fuel-conditioning element in the second passageway; and a valve mechanism supported by the housing and disposed downstream of the first fuel-conditioning element, downstream of the second fuel-conditioning element, and upstream of the outlet, wherein the valve mechanism is movable to selectively impede backflow of the fuel from the outlet toward the second fuel-conditioning element when the valve plug is in the first location and impede backflow of the fuel from the outlet toward the first fuel-conditioning element when the valve plug is in the second location, thereby facilitating the replacement of the first cartridge when the valve plug is in the first location and facilitating the replacement of the second cartridge when the valve plug is in the second location.

22. A method of conditioning a fuel using a fuel conditioning device, the method comprising the steps of:

defining a housing including an inlet, an outlet, a first passageway and a second passageway wherein the first and second passageways are downstream of the inlet and upstream of the outlet relative to the fuel flowing from the inlet to the outlet;

removably attaching a first cartridge to the housing;

attaching a first fuel conditioning element to the first cartridge wherein the fuel conditioning element is disposed in the first passageway;

removably attaching a second cartridge to the housing;

attaching a second fuel conditioning element to the second cartridge and disposing said second fuel conditioning element in the second passageway;

interposing a first valve seat between the inlet and the first passageway;

interposing a second valve seat between the inlet and the second passageway;

disposing a valve plug in the inlet of the housing wherein the valve plug is selectively movable to a first location where the valve plug disengages the first valve seat to place the inlet in fluid communication with the first fuel conditioning element in the first passageway and to a second location such that the valve plug disengages the second valve seat to place the inlet in fluid communication with the second fuel conditioning element in the second passageway;

providing a first marking adjacent the first fuel conditioning element;

providing a second marking adjacent the second fuel conditioning element;

connecting a valve operator to the housing and the valve plug such that the valve operator is moveable relative to the housing between a first position and a second position to selectively move the valve plug between the first location and the second location respectively disposing a first mark on the valve operator corresponding to the first marking adjacent the first fuel conditioning element; and disposing a second mark on the valve operator corresponding to the second marking adjacent the second fuel conditioning element;

wherein the housing covers the second mark and the valve operator is in the first position thereby indicating the inlet is in fluid communication with the first fuel conditioning element in the first passageway; and wherein the housing uncovers the second mark when the valve operator is in the second position thereby indicating the inlet is in fluid communication with the second fuel conditioning element in the second passageway.

* * * * *